United States Patent Office 2,974,888
Patented Mar. 14, 1961

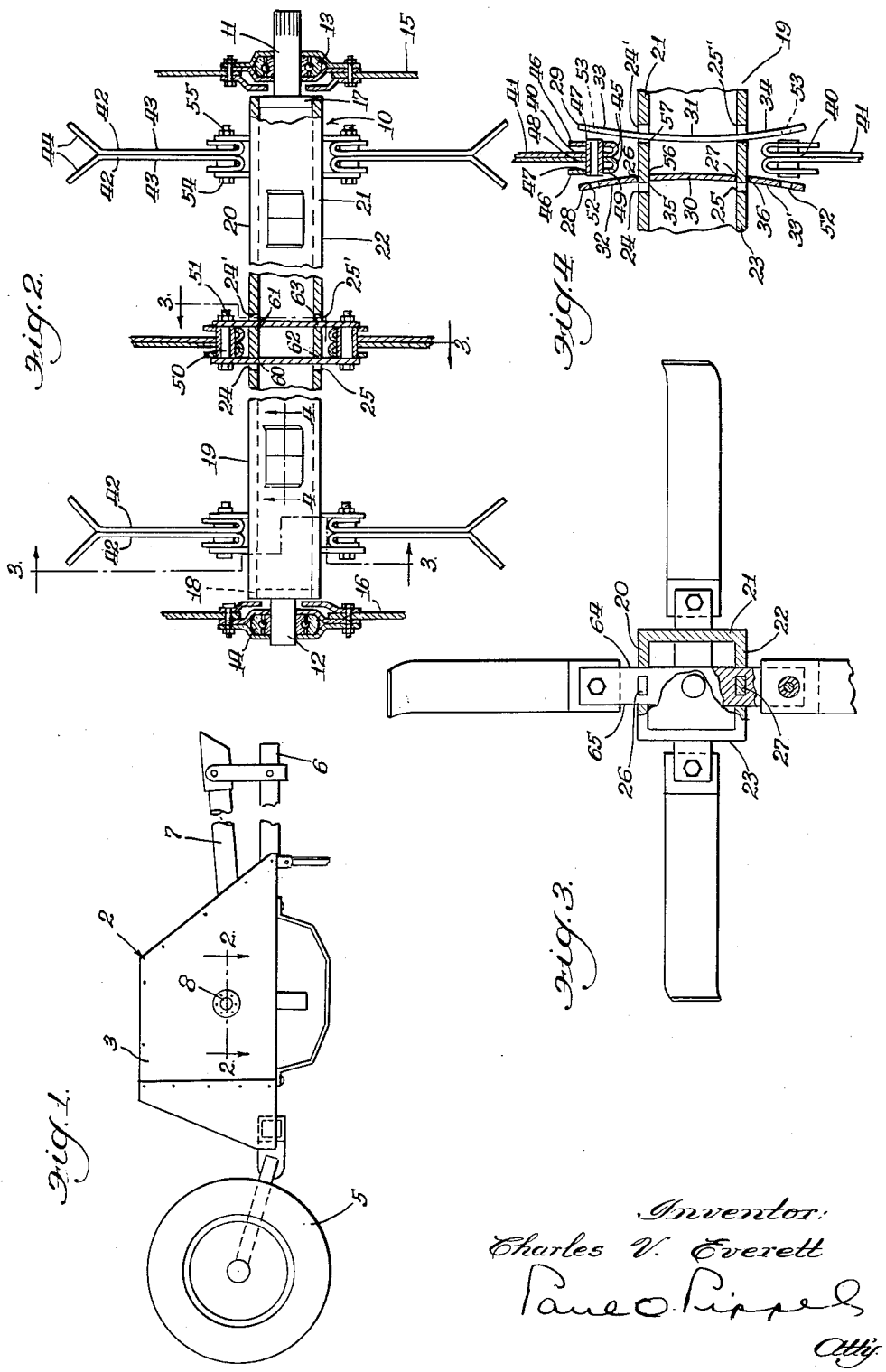

2,974,888

FLAIL TYPE CHOPPER ROTOR

Charles V. Everett, Warrenville, Ill., assignor to International Harvester Company, Chicago, Ill., a corporation of New Jersey Filed June 27, 1958, Ser. No. 744,961

5 Claims. (Cl. 241—191)

This invention relates to choppers and more particularly to a flail type chopper rotor.

A general object of the invention is to provide a novel simplified chopper head which includes a novel simplified construction of the rotor shaft and mounting for the flails or knives.

A more specific object of the invention is to provide a novel rotor incorporating a tubular shaft structure through which are mounted pairs of straps in interlocking engagement therewith, the straps serving as mounts for associated flails.

A more specific object of the invention is to provide a novel flail mounting from a rotor shaft which includes a pair of resilient straps extending transaxially through the center shaft, the straps being sprung and yieldably engaging intervening portions of the rotor shaft and interlocked therewith pursuant to the tightening of bolts which mount the flails at opposite ends of the straps.

Another object of the invention is to provide a novel mounting for the flails in a rotor of the type described which provides a simple expedient to renew or remove and replace the knives.

These and other objects of the invention will become more apparent from the specification and the drawings, wherein:

Figure 1 is a side elevational view of one form of harvester incorporating the invention;

Figure 2 is an enlarged broken apart sectional view taken substantially on the line 2—2 of Figure 1;

Figure 3 is a cross sectional view of the rotor taken substantially on the line 3—3 of Figure 2; and Figure 4 is a fragmentary enlarged axial sectional view taken essentially on line 4—4 of Figure 2 and illustrating the parts in position for assembly.

Describing the invention in detail and having particular reference to the drawings, there is shown in Figure 1 an exemplary form of harvester commonly known as a field chopper designated 2 which has a housing 3 preferably of frusto-pyramidal form which is carried at its rear by a wheel and axle assembly 5 and incorporates a forwardly extending hitch structure 6 with a power drive 7 to the center shaft 8 of the rotor generally designated 10.

The center shaft 8 incorporates a pair of cylindrical stub shaft end portions 11 and 12 which are carried in bearings 13 and 14 in the side walls 15 and 16 of the housing 3 and the stubs 11 and 12 are suitably connected through end plates 17 and 18 telescoped within and welded to the opposite ends of the tubular, preferably square, center portion 19, which includes the walls 20, 21, 22 and 23, the walls 20, 22 and 21, 23 opposing each other respectively, as best seen in Figure 3.

Each pair of walls 20, 22 and 21, 23 are provided with transaxially or radially aligned pairs of rectangular slots 24, 25 and 24', 25'. Within one of the slots 24 of each pair and the opposing or diametrically aligned slots 25 of the associated pair there is provided from the walls 20 and 22 or 21, 23 locking lugs 26, 27.

Mounting elements or straps 28 and 29 extend respectively through the slots 24, 25 and 24' and 25' and it will be seen from consideration of Figure 4 that in their relaxed position the steel spring straps 28 and 29 are concavo-convex and are bowed toward each other with their convex sides 30, 31 facing each other so that the end portions 32, 33 diverge outwardly of the center portion 19 of the shaft and the end portions 33', 34 also project outwardly of the center portion and diverge in a direction outwardly therefrom.

The strap 29 is provided with a pair of openings or apertures 35 and 36 which receive the complementary lugs 26 and 27 respectively therein for holding the mounting assembly 28, 29 from radial displacement with respect to the center shaft portion 10. The lugs holding lugs 26 and 27 are integral with the walls of the center section. The end portions 32, 33 as well as the end portions 33', 34 receive the inner or root ends 40 of the identical knife assemblies 41.

Each assembly 41 comprises a pair of knives 42, and each knife includes a flat shank portion 43 in abutting back-to-back engagement with the shank portion of the other knife. The outer ends of the shanks 42 are provided with outwardly diverging cutting portions 44 and the inner or root ends of the shank portions 43 are provided with U-shaped inner end portions 45 which are formed by bending over the inner ends of the shank portions to provide axially outwardly spaced spacer and mounting portions 46, the mounting portions 46 being provided with transverse openings 47 which align with transverse openings 48 in the inner ends of the shank portions 42 and which admit a spacer sleeve 49 therethrough. The sleeve 49 admits the shank 50 of a bolt therethrough, the shank passing through aligned openings 52 and 53 in the end portions 32, 33 or 33', 34 and having a head 54 outwardly of the related end portion of the mounting strap and at its other end being threaded and provided with a securing nut 55 by means of which the straps are drawn against opposite ends of the spacer and at the same time are deflected toward the opposite lateral edges or margins 60, 61 of the openings 24, 24' and 62, 63 of the openings 25, 25' whereby the knife assembly is yieldably held against axial displacement and is interlocked securely against radial displacement. Circumferential displacement is prevented by the abutment of the edges 64, 65 of each knife with the opposed margins of the related aperture.

It will be readily appreciated that if any knife of any series should break it would be an extremely simple matter to remove any knife without the necessity of removing unnecessary elements. At the same time a simple and effective yieldable mounting is provided for the knife blades.

What is claimed is:

1. A chopper comprising a center axial support member including a pair of transaxially opposed wall portions, with pairs of aligned radial openings therethrough, a pair of mounting straps extending through respective pairs of openings and spaced axially of said member, means on the straps and said member releasably interlocking the straps against movement radially of said member, knife elements interposed between said straps, and means interconnecting the knife elements with the straps and drawing them together against an intervening axial portion of said member therebetween.

2. The invention according to claim 1 and said interlocking means comprising lugs on the member extending through apertures on the straps axially of said member.

3. In a device of the class described, a center shaft structure including a tube, a pair of knife mounting axially spaced straps extending through aligned apertures in the tube, said straps being formed of spring steel and bowed toward each other, and means interconnecting corresponding ends of said straps and drawing the intermediate portions of the straps tightly against an intervening portion of the tube attendant to straightening said straps.

4. The invention according to claim 3 and axial projections on said tube in the apertures therein and extending through openings in the related strap.

5. In a chopper comprising a shaft having a pair of substantially radial, axially spaced openings therein, a pair of elongated knife-mounting straps extending through said openings in the shaft and having end portions projecting radially outwardly of the shaft, and tensile means drawing said straps toward each other against an intervening portion of the shaft for securing the straps thereto against radial displacement with respect to the shaft.

References Cited in the file of this patent
UNITED STATES PATENTS

| | | |
|---|---|---|
| 2,133,451 | Henlein | Oct. 18, 1938 |
| 2,494,705 | Hamilton | Jan. 17, 1950 |
| 2,810,529 | Jensen | Oct. 22, 1957 |
| 2,813,684 | Jensen | Nov. 19, 1957 |